US011294760B2

(12) United States Patent
Feekes, Jr.

(10) Patent No.: US 11,294,760 B2
(45) Date of Patent: Apr. 5, 2022

(54) METHODS AND APPARATUS FOR A TEMPORAL SYNCHRONIZATION UNIT

(71) Applicant: SEMICONDUCTOR COMPONENTS INDUSTRIES, LLC, Phoenix, AZ (US)

(72) Inventor: Dannie Gerrit Feekes, Jr., Corvallis, OR (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 339 days.

(21) Appl. No.: 16/730,381

(22) Filed: Dec. 30, 2019

(65) Prior Publication Data
US 2021/0200624 A1 Jul. 1, 2021

(51) Int. Cl.
*G06F 11/00* (2006.01)
*G06F 11/07* (2006.01)
*G06F 9/48* (2006.01)

(52) U.S. Cl.
CPC ........ *G06F 11/0793* (2013.01); *G06F 9/4812* (2013.01); *G06F 11/073* (2013.01); *G06F 11/076* (2013.01); *G06F 2209/486* (2013.01)

(58) Field of Classification Search
CPC .... G06F 9/4812; G06F 11/073; G06F 11/076; G06F 11/0793; G06F 2209/486
See application file for complete search history.

(56) References Cited

U.S. PATENT DOCUMENTS

| 11,025,357 B1* | 6/2021 | Sayed .................. G06F 9/542 |
| 2016/0352388 A1 | 12/2016 | Lane |
| 2017/0242442 A1 | 8/2017 | Minster |
| 2018/0365859 A1 | 12/2018 | Oba |
| 2021/0096985 A1* | 4/2021 | Kim ................... G06F 12/0246 |

* cited by examiner

*Primary Examiner* — Joshua P Lottich
(74) *Attorney, Agent, or Firm* — Dickinson Wright PLLC (57) ABSTRACT

Various embodiments of the present technology may comprise a method and apparatus for a temporal synchronization circuit. The temporal synchronization circuit may be configured to operate in conjunction other integrated circuits to align data received from a plurality of sensors. The temporal synchronization circuit generates time stamps for generated data that are used to correct for any temporal deviation in the data received from the sensors to mitigate fault conditions that may be generated by misaligned data. The temporal synchronization circuit may also generate a power management scheme based on the particular characteristics of a SRAM to adjust power requirements according to any temporal deviation in the received sensor data.

20 Claims, 7 Drawing Sheets

METHODS AND APPARATUS FOR A TEMPORAL SYNCHRONIZATION UNIT

BACKGROUND OF THE TECHNOLOGY

Temporal derivation between data from a plurality of sensors lends to a loss of accuracy when performing object detection by convoluted neural networks. In worse case scenarios it can lead to loss of object detection functionality. This invention solves this problem by providing a solution that generates time stamps with the data output from multi modal sensors which are used to align the data and detect temporally misaligned conditions that could lead to a fault or safety violation.

SUMMARY OF THE INVENTION

Various embodiments of the present technology may comprise a method and apparatus for synchronizing sensor data received by a digital signal processor (DSP) from a plurality of sensors generating independent sensor data. A temporal synchronization circuit may be configured to operate in conjunction with other integrated circuits to align data received from a plurality of sensors. The temporal synchronization circuit generates time stamps for generated data that are used to correct for any temporal deviation in the data received from the sensors to mitigate fault conditions that may be generated by misaligned data. The temporal synchronization circuit may also generate a power management scheme based on the particular characteristics of a SRAM to adjust power requirements according to any temporal deviation in the received sensor data.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various sensors, analog-to-digital converters, signal processors, storage devices, and semiconductor devices, such as: converters, comparators, image processing units, and the like, which may carry out a variety of functions. In addition, the present technology may be practiced in conjunction with any number of systems, such as automotive, aerospace, imaging, and autonomous vehicles, and the systems described are merely exemplary applications for the technology. Further, the present technology may employ any number of conventional techniques for processing image sensor data, sampling image data, processing LIDAR or RADAR sensor data, calculating latency of sensor data and the like.

Methods and apparatus for synchronizing sensor data received by a digital signal processor (DSP) according to various aspects of the present technology may operate in conjunction with any suitable electronic system, such as advanced driver assist systems (ADAS), systems that receive multi modal sensor data, and the like. Further, methods and apparatus for synchronizing sensor data received by a (DSP) may be utilized with any suitable imaging processing system, such as a camera system, video system, LIDAR/RADAR, machine vision, vehicle navigation, surveillance system, motion detection system, collision avoidance system, and the like.

Figure 1:
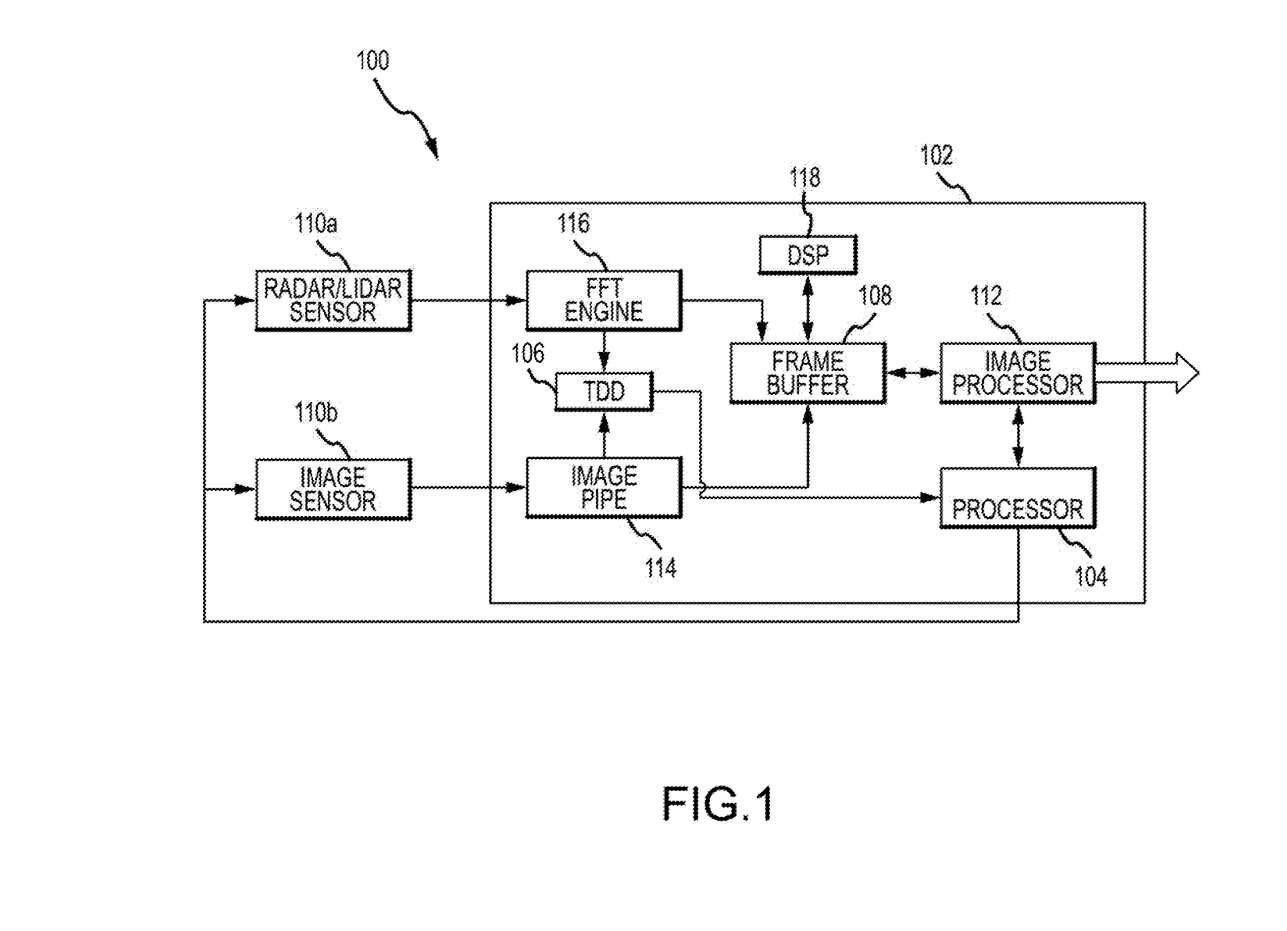
FIG. 1 representatively illustrates an imaging system in accordance with an exemplary embodiment of the present technology.

Referring to FIG. 1, an exemplary system may comprise a vehicle system, such as an advanced driver assistance system 100. The ADAS may comprise various systems, sensors, and integrated circuits configured to communicate with one or more peripheral systems, such as: a vehicle navigation system, a vehicle braking system, a steering system, a video display, and the like. For example, in one embodiment, the ADAS 100 may comprise a plurality of external sensors 110 and a signal processor 102. For example, a first sensor 110a may comprise a RADAR or LIDAR sensor configured to generate sensor data corresponding to a detected distance of an object from the first sensor 110a. A second sensor 110b may comprise an image sensor configured to generate sensor data corresponding to an image of the detected object. The signal processor 102 may receive the generated sensor data from each external sensor 110 and process the received data to generate an output of image and distance data to one or more externals systems according to the received sensor data.

The signal processor 102 uses a temporal synchronization circuit to process received sensor data to account for temporal deviation in the received sensor between the external sensors 110. The signal processor 102 is configured to embed one or more time stamps within the metadata associated with the sensor data output from the external sensors 110. The signal processor 102 uses the embedded time stamps to analyze the received sensor data to determine if the received sensor data from all sensors 110 can be aligned (synchronized) and processed or if the temporal alignment exceeds an acceptable deviation that could lead to a fault or safety condition caused by the misaligned data.

To achieve this, the signal processor 102 may comprise an image signal processor 112 that is configured to analyze the metadata from each external sensor 110. The signal processor 102 may further comprise an independent input 114, 116 for receiving the sensor data from the first and second sensors 110a, 110b. For example, a first input 116 may comprise a fast Fourier transform (FFT) circuit each configured to perform a fast Fourier transform algorithm on incoming sensor data from the first sensor 110a. A second input sensor 114 may be configured to receive image sensor data from the image sensor 110b.

To assist with the synchronization of the received sensor data, the signal processor may also comprise a processor circuit 104 configured to reset a time stamp counter in each external sensor 110. For example, referring now to FIGS. 2 and 3, the processor circuit 104 may comprise a boot security processor for generating a time stamp information signal that may be used to reset a time stamp counter in each external sensor 110. The time stamp information signal may comprise any suitable indication or data. In one embodiment the processor circuit 104 may comprise a synchronization circuit configured to generate a time stamp pulse that is provided to each sensor upon startup to ensure that the time stamp counter in each external sensor 110 is the same. Resetting the time stamp counters in each external sensor 110 ensures that synchronous sensor data generated by each external sensor 110 contain time stamps that are equal in time. Alternatively, the time stamp information signal may comprise an instruction for each external sensor 110 to reset their respective time stamp counter to a specified value, count, or time.

Figure 2:
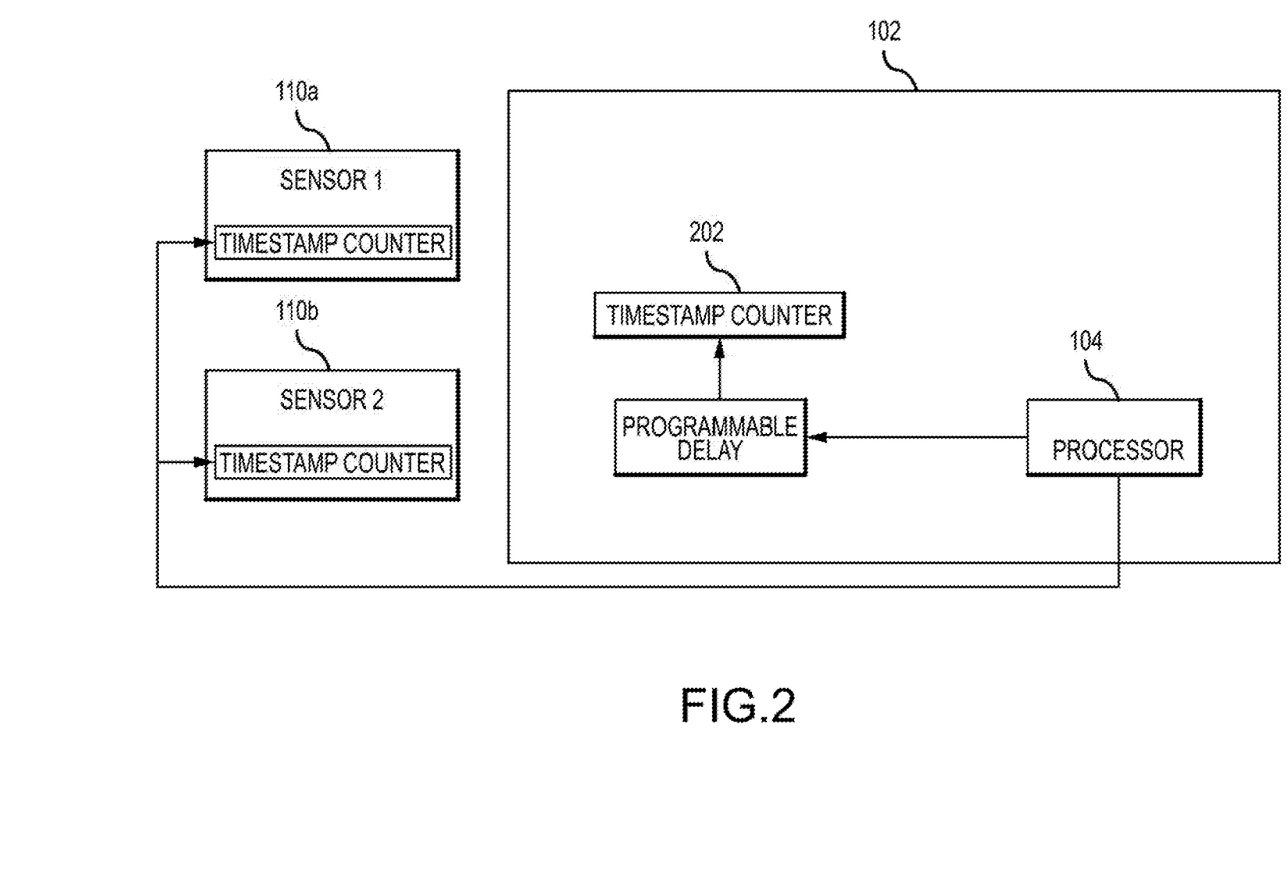
FIG. 2 is a block diagram of a synchronization circuit in accordance with an exemplary embodiment of the present technology.
Figure 3:
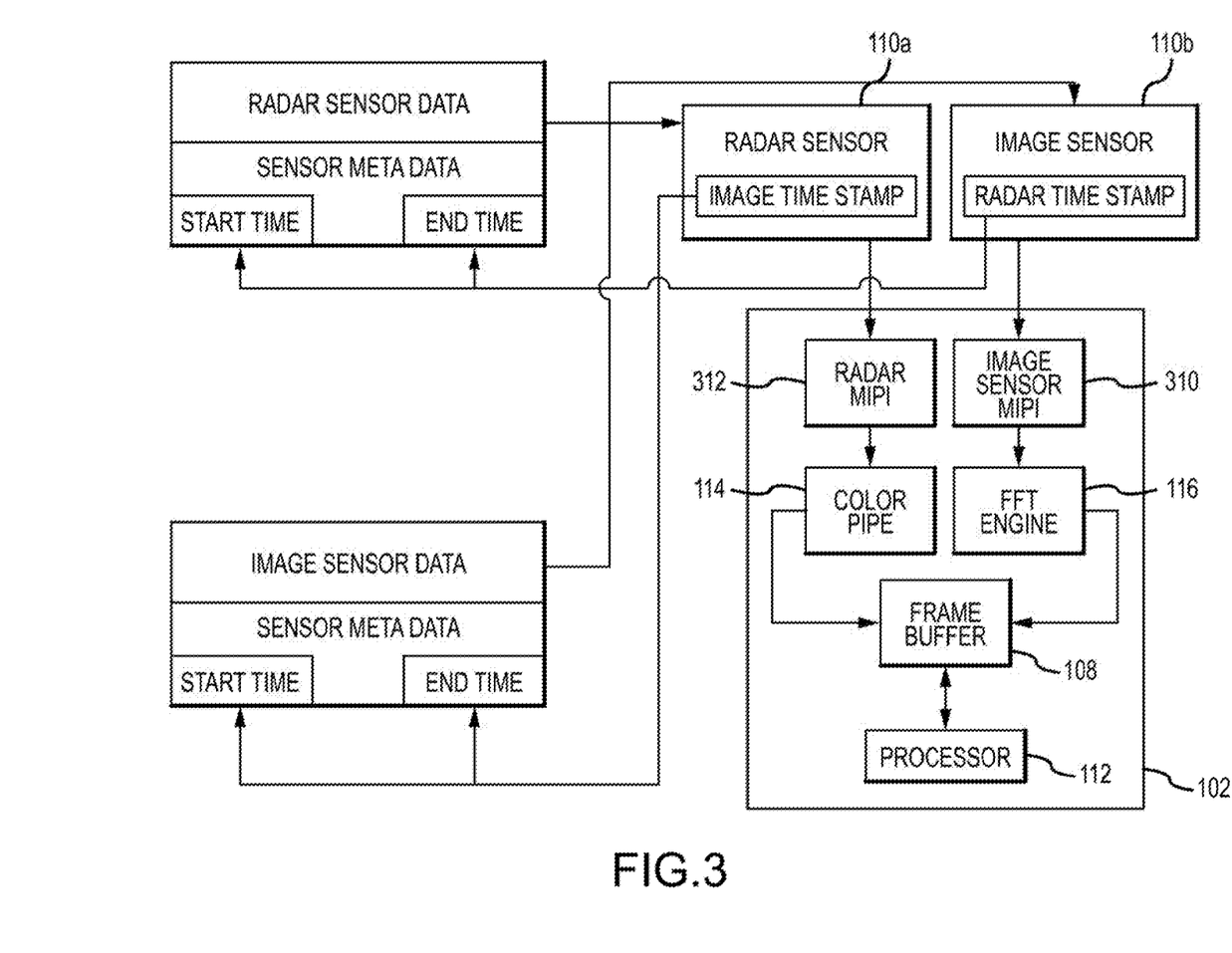
FIG. 3 is a block diagram of a processing method for metadata in accordance with an exemplary embodiment of the present technology.

Associating time stamps with synchronously generated sensor data allows the signal processor 102 to account for temporal deviations within the sensor data that may arise from a variety of factors such as transmission latency, processing latency, interfaces, or available memory. For example, the signal processor 102 may receive simultaneous data from the first and second sensors 110a, 110b. Each external sensor 110 may contain logic that "time stamps" the sensor data by recording the start and end time a given line or frame is received. Although the first and second sensors 110a, 110b may generate and transmit the sensor data simultaneously, the processing time between when the sensor data is received by the signal processor 102 and it is stored in a memory frame buffer 108 may differ. This deviation could result in accuracy errors if the sensor data from each external sensor 110 was simply processed as it was received.

The frame buffer 108 may comprise any suitable device or system to temporarily store sensor data from multiple source inputs. In an exemplary embodiment, the frame buffer 108 may be implemented utilizing a memory device, such as an SRAM (static random-access memory) configured to store relevant data. The SRAM may comprise a conventional SRAM array formed on a substrate using conventional components, such as transistors with a gate, a drain, and a source. For example, the SRAM may comprise a plurality of SRAM block cells, wherein each SRAM block cell comprises two access transistors and two cross-coupled inverters. The SRAM may further comprise peripheral control logic to control various operations, such as powering individual SRAM block cells and/or switching a given SRAM block cell from one state to a different state. For example, the SRAM block cell may comprise a read state (data has been requested), a write state (updating the contents), a standby state (the circuit is idle), and/or a leakage mitigation state (e.g., a "transparent" mode), wherein the SRAM is still active (i.e., reading and writing), but operating at lower specifications to reduce power leakage. The SRAM block cell may be coupled to one or more bit lines to transfer data during the read state and write state As the sensor data is received, the signal processor 102 first and second inputs 114, 116 may be configured to maintain the sensor data timestamp as the data is received and stored prior to being processed and output by the signal processor as image and distance data to other externals systems. The signal processor 102 is configured to process sensor data from the external sensors 110 that has synchronous time stamps simultaneously with each other. Alternatively, and depending on the processing capabilities of the signal processor 102, the sensor data having synchronous time stamps may not be processed exactly simultaneously, but instead within a margin of time that is able to account for the storage requirements of the signal processor 102 given the rate at which sensor data is being received from the external sensors 110. If the signal processor 102 processed sensor data having asynchronous time stamps the resulting data output from the signal processor 102 could contain accuracy errors that might create a safety concern.

Figure 4:
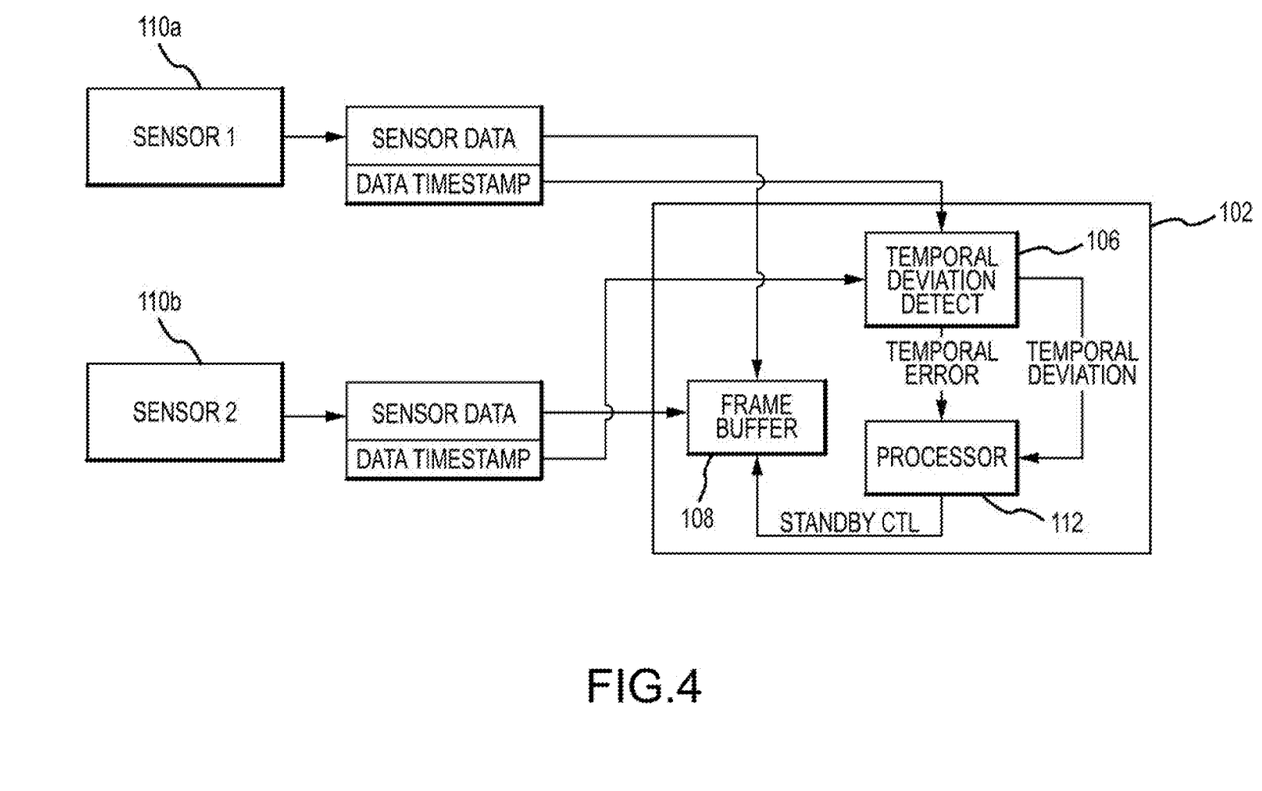
FIG. 4 is a block diagram of a temporal deviation detection circuit in accordance with an exemplary embodiment of the present technology.

Referring now to FIG. 4, the signal processor may further comprise a temporal deviation detection (TDD) unit 106 that is used to analyze the received sensor data time stamps and determine if any temporal deviation between the time stamps is within a predetermined fault tolerance. For example, time stamps from each external sensor 110 may be transmitted to the TDD 106 as the incoming sensor data from each external sensor 110 is being temporarily stored to the frame buffer 108.

As the TDD 106 is receiving the time stamps the device is configured to calculate a current temporal deviation in the time stamp data between each external sensor 110 providing sensor data. Based upon the calculated current temporal deviation the TDD 106 determines an amount of frame buffer 108 memory required to hold sensor data from the external sensor 110 having an earlier time stamp (faster sensor) until the sensor data from the slower external sensor 110 (external sensor having the later time stamp) data is received. If the calculated current temporal deviation exceeds a programmed threshold or the frame buffer resources are not sufficient to hold all of the sensor data from the faster sensor 110 until the sensor data from the slower sensor 110 data is available, the TDD 106 will generate a fault signal.

The TDD 106 may be programmed to account for factors unique to each type of external sensor 110 such as frame capture rate, transmission rate, signal conversion rates, or other like factors that may contribute to latency between the received sensor data. Alternatively, the TDD 106 may be in communication with each external sensor 110 and be configured to receive real-time information from each sensor 110 that may be used to calculate the current temporal deviation.

In the event that the TDD 106 generates a fault signal, the TDD 106 may also be configured to initiate a fault correction sequence to attempt and bring the current temporal deviation back within the threshold. The fault correction sequence may comprise any suitable method, operation, or function that brings the calculated temporal deviation back within the predetermined threshold of the signal processor 102. For example, and referring now to FIG. 5, if the TDD 106 detects a temporal deviation outside of the threshold, the TDD 106 may generate a signal indicating the determination of the fault condition and provide that signal to a host processor 502 in the signal processor 102 in the form of an interrupt.

Figure 5:
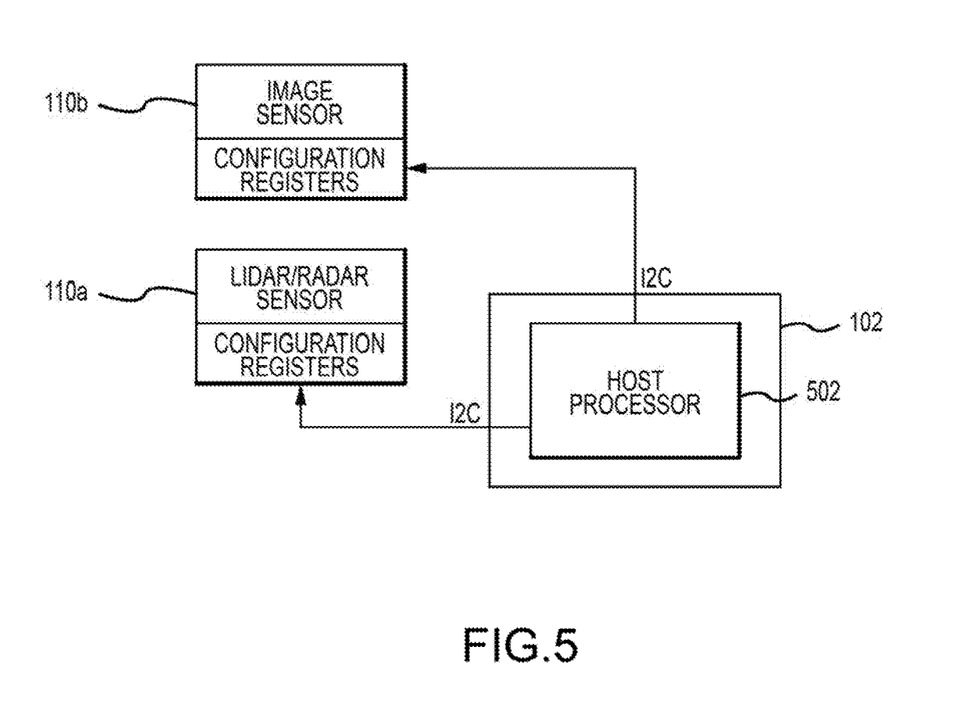
FIG. 5 is a block diagram of a fault correction system in accordance with an exemplary embodiment of the present technology.

An interrupt handler may then be invoked by the host processor 502 causing a set of configuration data to be transmitted to the external sensors 110a, 110b. The set of configuration data may comprise any suitable information or instructions for adjusting one or more performance characteristics of the external sensors 110a, 110b. In one embodiment, the set of configuration data may comprise sensor a set of register writes provided to a configuration register within each sensor 110. The register writes may contains instructions such as: a soft reset one or more external sensor 110, a reconfiguration of the sample rate of one or more external sensor 110, an alteration of the clocking of one or more external sensor 110, and a polling of one or more external sensor 110 for status to determine the fault cause and provide corrective action either internally within the signal processor 102 or externally to one or more external sensor 110.

For example, in one exemplary example, if the second sensor 110*b* is an image sensor that generates image data at 30 frames per second (fps) and the frame buffer 108 of the image processor 102 is able to store 4 megabytes of data, then the TDD 106 may signal a fault condition if the temporal deviation between the first sensor 110*a* and the second sensor 110*b* exceeds 400 milliseconds. The fault condition occurs because the frame buffer 108 is incapable of storing sufficient sensor data from the second sensor 110*b* to account for the temporal deviation and allow for the image sensor 102 to process sensor data from both external sensors 110 that have corresponding time stamps. To address this fault condition, the host processor 502 may create a set of configuration data that adjusts the capture rate of the second sensor 110*b* such that the temporal deviation between the two external sensors 110*a*, 110*b* is reduced to a value that falls within the memory constraints of the frame buffer 108.

The TDD 106 may further be configured to provide power management control logic to predict and manage power management states for memory devices resident and therefore reduce power requirements for the signal processor 102. The TDD 106 may comprise any system, hardware, or logic for determining a power management state of the signal processor 102, the frame buffer 108, or any other system component. In one embodiment, and referring now to FIG. 6, the TDD 106 may be configured to compare the calculated temporal deviation against a set of threshold registers 602 coupled to a plurality of compare circuits 604 and provide the result to a power management unit (PMU) 606 that is configured to control the power requirements of the frame buffer 108.

Figure 6:
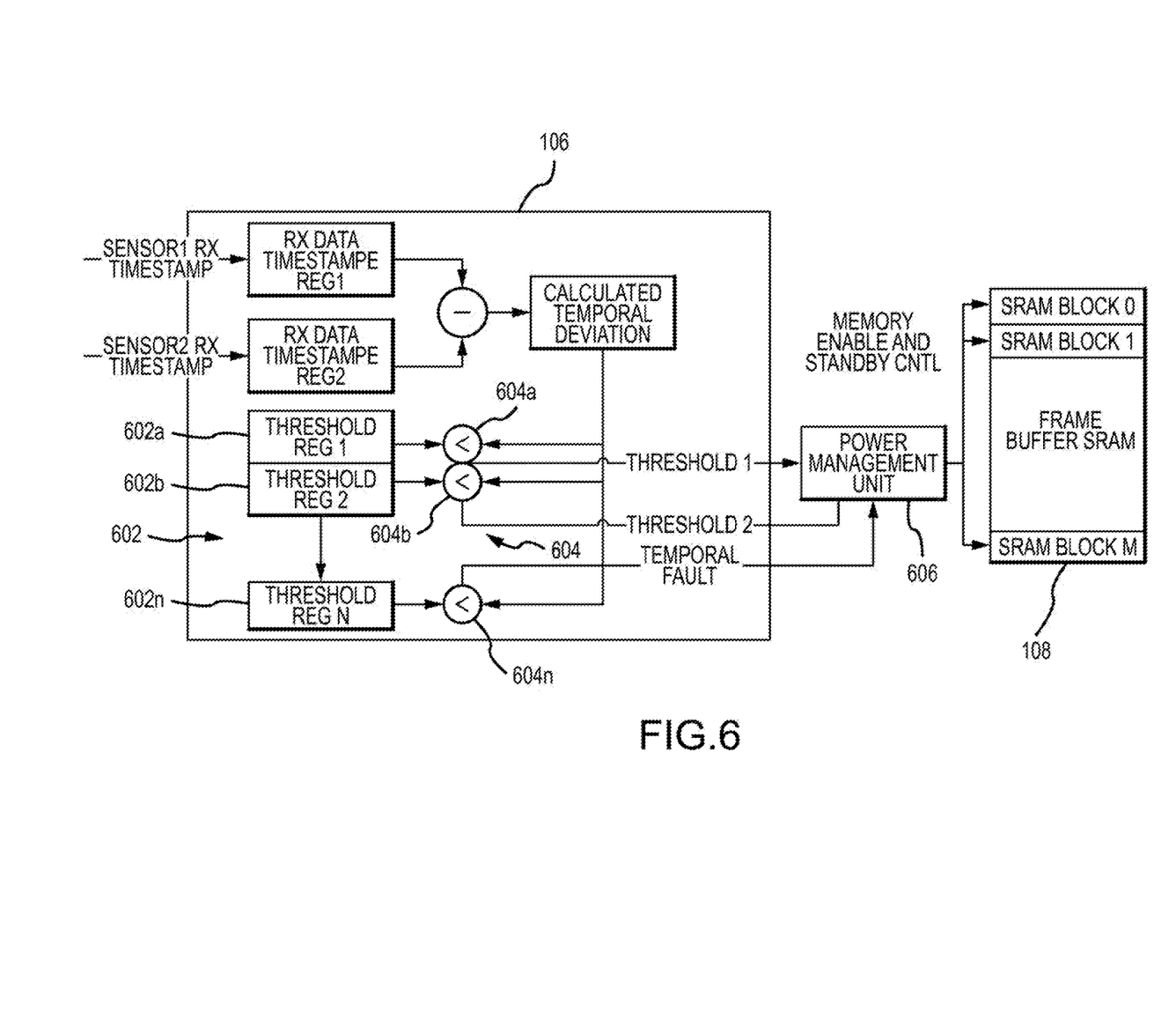
FIG. 6 is a block diagram of a power management sequence in accordance with an exemplary embodiment of the present technology.

The set of threshold registers 602 may comprise a series of programmable registers each programmed with a threshold value. The set of threshold registers 602 may be arranged in increasing order from a baseline (low) threshold to an ultimate (high) threshold that may correspond to the predetermined threshold value associated with the fault condition.

Each compare circuit 604 compares two input values and outputs a signal indicating the relationship between the two input values. Each compare circuit 604 may comprise any suitable circuit for comparing two input values and outputting a value indicating which of the two inputs value is greater, such as a conventional comparator. For example, an output of a first register 602*a* may be coupled to a first input of a first comparator 604*a*. A second input of the first compare circuit 604*a* may receive the calculated current temporal deviation. The first compare circuit 604*a* may be configured to compare the two inputs. If the value of the first input of the first comparator 604*a* exceeds the value of the second input then a signal may be sent to the PMU 606 indicating that the calculated current temporal deviation has exceeded the initial threshold. In response, the PMU 606 may provide a signal to the frame buffer 108 that signals that additional memory resources are required.

If the initial threshold has been exceeded, then a first input of a second comparator 604*b* may compare an output of a second register 602*b* that is coupled to a first input of a second comparator 604*b* to the calculated current temporal deviation that is provided to a second input of the second comparator 604*b*. The second comparator 604*b* may then compare the two inputs and if the value of the first input of the second comparator 604*b* exceeds the value of the second input then a second signal may be sent to the PMU 606 indicating that the calculated current temporal deviation has exceeded a second threshold level. In response, the PMU 606 may provide a second signal to the frame buffer 108 that signals that additional memory resources are required thereby allowing the frame buffer 108 to draw more power.

This process may be continued until a final comparator 604*n* that is coupled to the ultimate (high) threshold register 602*n* is reached. If the final comparator 604*n* determines that the temporal deviation has exceeded the set value of the ultimate (high) threshold register 602*n*, then not only may a signal be sent to the PMU 606, but the TDD 106 may generate the fault condition signal.

The power management unit (PMU) 205 monitors and responds to signals received from the TDD 106. For example, the PMU 205 may transmit various signals to the frame buffer 108 indicating how much power the frame buffer 108 may use or draw from a power source or how much available memory the frame buffer 108 may require at any given time. The PMU 205 may comprise any number of components suitable for monitoring the comparators 604, storing one or more predetermined allotted memory values, and transmitting various signals according to the outcome of the comparison.

In various embodiments, the PMU 606 may employ one or more power management schemes to operate the frame buffer 108 and/or the external sensor 110 under predetermined conditions. A given power management scheme may control any suitable function or condition such as power consumption and/or leakage current of the frame buffer 108 and/or control the frame rate of the second sensor 110*b*. Each power management scheme may allow the frame buffer to operate at a power consumption level suitable for a particular condition. For example, in various embodiments, the frame buffer 108 may function in a standby state, wherein portions of the SRAM peripheral control logic can be powered down while maintaining the current state (e.g., reading or writing) of the frame buffer 108. Additionally, or in alternative embodiments, the frame buffer 108 may comprise the standby state and/or a leakage mitigation state, wherein the bit lines of the SRAM block cell can be floated while maintaining the current state of the frame buffer 108. Additionally, or in alternative embodiments, the frame buffer 108 may comprise a second voltage rail that can be lowered while maintaining the current state of the frame buffer 108. Additionally, or in alternative embodiments, a supply voltage for the frame buffer 108 (SRAM supply voltage) may be raised to reduce current leakage between the drain and the substrate of the SRAM block cell when the frame buffer 108 is in the standby state or the leakage mitigation state.

The power management schemes may be established according to any suitable requirements of the signal processor 102, such as the latency requirements of the external sensors 110 and/or based on the particular characteristics and specifications (e.g., operating temperatures, operating power, operating current, operating voltage, etc.) of the frame buffer 108. For example, the power management schemes may be configured to: reduce the frame rate and enable the frame buffer 108 to enter a low latency standby state; reduce the frame rate and enable the frame buffer 108 to enter a high latency standby state; reduce the frame rate and reduce the second voltage rail on the SRAM; and/or power-down the frame buffer 108 when a fault condition is detected.

The threshold values of the registers 602 may be selected according to any suitable criteria such as the operating specifications of one or more external sensors 110 and/or the frame buffer 108, wherein each threshold and/or maximum latency time effects a different change in the operation and selected power management scheme. In an exemplary embodiment, each threshold 602a-n is programmed with different threshold values.

Figure 7:
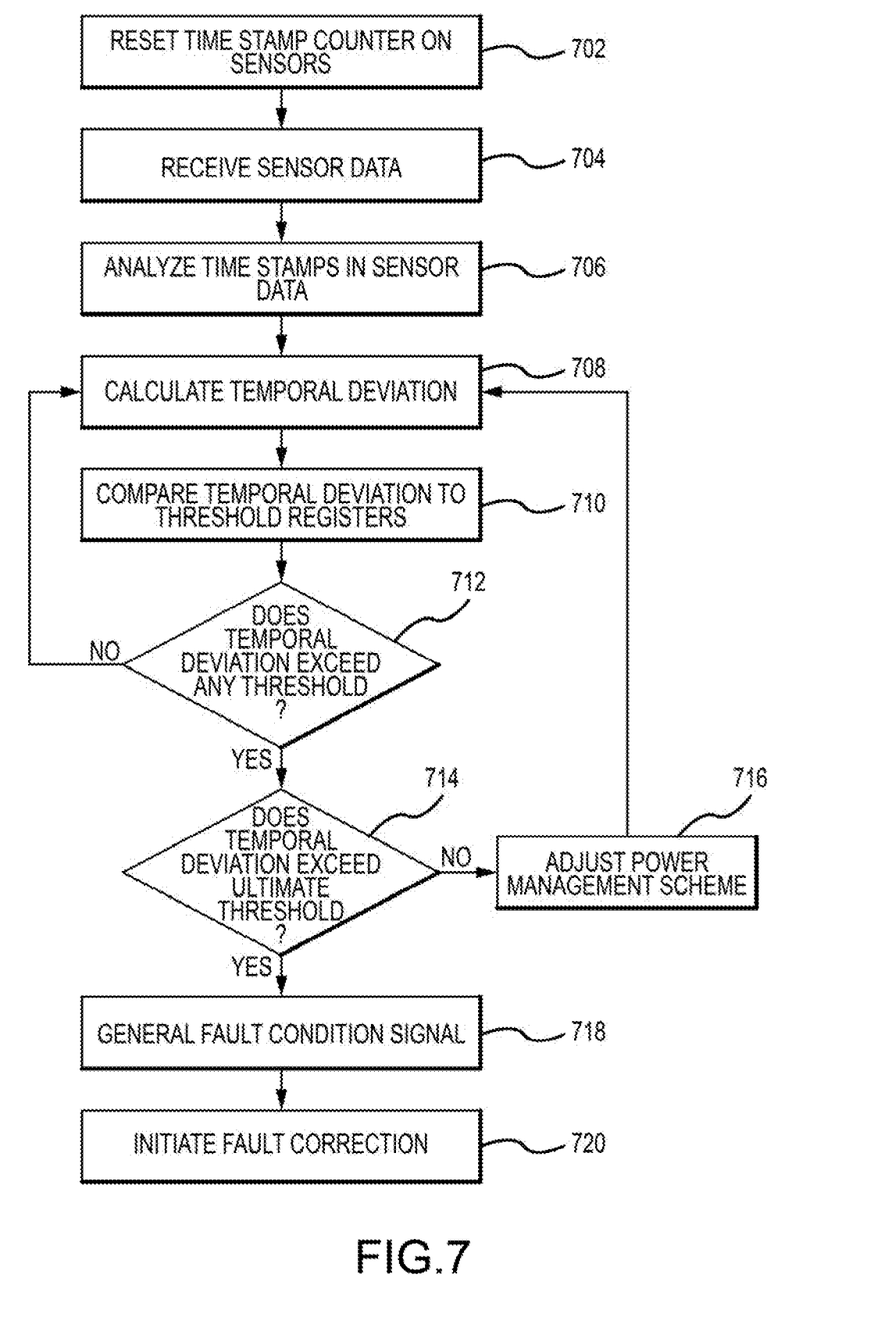
FIG. 7 is a flow chart in accordance with an exemplary embodiment of the present technology.

Referring now to FIG. 7, in operation, upon power up a boot processor 104 within a signal processor 102 may generate a time stamp information signal that is transmitted from the signal processor 102 to one or more external sensors 110 to reset a time stamp counter within each sensor 110 to initialize/synchronize each sensor 110 (702). The external sensors 110 may then start generating and providing sensor data to the signal processor (704). The TDD 106 may then review the metadata associated with the received sensor data from each external sensor 110 to ascertain the time stamps for the received sensor data (706). When the time stamps have been identified the TDD 106 may then calculate a current temporal deviation between the received time stamps (708).

The calculated current temporal deviation is used by the TDD 106 to determine if there are sufficient resources to process sensor data having synchronous time stamps. The TDD 106 may also use the calculated current temporal deviation to actively adjust power requirements of the signal processor 102 or any system components such as the frame buffer 108. To accomplish this, the TDD 106 may comprise a set or plurality of threshold registers 604, wherein each register within the plurality may be set or programmed to a different time value. Each registered 604 may be coupled to a compare circuit 604 that is configured to compare the corresponding threshold value against the calculated current temporal deviation (710).

If the result of the comparison is that none of the threshold registers 604 are exceeded by the calculated current temporal deviation, then the TDD 106 may enter into a continuous monitoring loop (712). If the result of the comparison does result in at least one threshold register 604 being exceeded by the calculated current temporal deviation, then the TDD 106 may determine whether or not an ultimate threshold register 604n has been exceeded by the calculated current temporal deviation (714). If the calculated current temporal deviation is still within a predetermined ultimate threshold value, then the TDD 106 may signal a power management unit 606 adjust a power management scheme according to the number of threshold registers 604 that have been exceeded (716).

If the ultimate threshold value is exceeded by the calculated current temporal deviation, then the TDD 106 may generate a fault condition signal (718). The fault condition signal may trigger an internal TDD 106 process for attempting to correct the fault condition or the signal may be transmitted to another component or system, such as a host processor 502 within the signal processor 102 to initiate a fault correction sequence (720).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A temporal synchronization circuit for a digital signal processor (DSP) receiving sensor data from a plurality of sensors generating independent sensor data, comprising:
  a processor circuit configured to:
    generate a time stamp information signal; and
    provide the generated time stamp information signal to each sensor to synchronize the time stamp counter in each sensor; and
  a temporal deviation detection device (TDD) configured to:

receive sensor data from each sensor;
analyze time stamp data from each sensor;
calculate a temporal deviation in the time stamp data between each sensor;
determine an amount of frame buffer memory in a SRAM required to store sensor data from a first sensor having a time stamp earlier in time than a time stamp from a second sensor;
determine if the temporal deviation is below a threshold value of the available memory buffer to store the sensor data from the first sensor until the sensor data from the second sensor contains a second time stamp that is equal to the time stamp of the first processor to allow sensor data from each sensor having the same time stamp to be processed by a processor of the DSP substantially simultaneously with each other; and
initiate a fault correction sequence if the temporal deviation exceeds the threshold value.

2. A temporal synchronization circuit according to claim 1, wherein the fault correction sequence comprises:
generating an interrupt signal; and
sending configuration data to each sensor.

3. A temporal synchronization circuit according to claim 2, wherein the processor circuit is configured to generate a second time stamp information signal and provide the second time stamp information signal to each sensor to synchronize the time stamp counter in each sensor following the configuration data being sent to each sensor.

4. A temporal synchronization circuit according to claim 2, wherein the configuration data comprises instructions that cause each sensor to perform at least one of: a soft reset, a reconfiguration of the sample rate of the sensor, an alteration of the clocking of the sensor, or provide a status to the TDD.

5. A temporal synchronization circuit according to claim 4, wherein the TDD is configured to:
determine a fault cause based upon the received status; and
provide corrective action to one of the: DSP or at least one of the plurality of sensors according to the determined fault cause.

6. A temporal synchronization circuit according to claim 1, wherein the time stamp information signal comprises at least one of: a pulse signal resetting each time stamp counter to zero, or a set time stamp value.

7. A temporal synchronization circuit according to claim 1, wherein the TDD comprises:
a plurality of threshold registers, wherein each threshold register stores a different predetermined threshold time value;
a plurality of compare circuits, wherein:
a first input of each comparator is coupled to an output from one of the plurality of threshold registers; and
a second input of each comparator receives the temporal deviation, wherein each compare circuit coupled to the temperature sensor and configured to:
compare the temporal deviation with one of the threshold time values; and
transmit a signal corresponding to a result of the comparison;
wherein the TDD is configured to implement a power management scheme of a power management unit within the DSP, based on the transmitted signal from any compare circuit from the plurality of compare circuits, to control the SRAM, comprising a plurality of SRAM frame buffer blocks, wherein the SRAM frame buffer blocks are capable of entering at least one of a shutdown, standby, and sleep state according to the power management scheme.

8. A method of synchronizing sensor data received by a digital signal processor (DSP) from a plurality of sensors generating independent sensor data, comprising:
generating a time stamp information signal with a processor circuit coupled to the DSP;
transmitting the generated time stamp information signal from the processor circuit to each of the plurality of sensors simultaneously, wherein the time stamp information signal synchronizes a time stamp counter in each sensor; and
receiving sensor data from each sensor with a temporal deviation detection device (TDD) embedded within the DSP, wherein the TDD is configured to:
analyze time stamp data from each sensor;
calculate a temporal deviation in the time stamp data between each sensor;
determine an amount of frame buffer memory in a SRAM required to store sensor data from a first sensor having a time stamp earlier in time than a time stamp from a second sensor;
determine if the temporal deviation is below a threshold value of the available memory buffer to store the sensor data from the first sensor until the sensor data from the second sensor contains a second time stamp that is equal to the time stamp of the first processor to allow sensor data from each sensor having the same time stamp to be processed by a processor of the DSP substantially simultaneously with each other; and
initiate a fault correction sequence if the temporal deviation exceeds the threshold value.

9. A method of synchronizing sensor data according to claim 8, wherein initiating the fault correction sequence comprises:
generating an interrupt signal with the TDD; and
sending configuration data to each sensor.

10. A method of synchronizing sensor data according to claim 9, further comprising generating a second time stamp information signal by the processor circuit and providing the second time stamp information signal to each sensor to reset and synchronize the time stamp counter in each sensor following the configuration data being sent to each sensor.

11. A method of synchronizing sensor data according to claim 9, wherein the configuration data comprises instructions that cause each sensor to perform at least one of: a soft reset; a reconfiguration of the sample rate of the sensor; an alteration of the clocking of the sensor; or provide a status to the TDD to determine a fault cause.

12. A method of synchronizing sensor data according to claim 11, wherein the TDD is configured to provide corrective action to one of the DSP for at least one of the plurality of sensors according to the determined fault cause.

13. A method of synchronizing sensor data according to claim 8, wherein the time stamp information signal comprises at least one of: a pulse signal resetting each time stamp counter to zero, or a set time stamp value.

14. A method of synchronizing sensor data according to claim 8, wherein the TDD comprises:
a plurality of threshold registers, wherein each threshold register stores a different predetermined threshold time value;
a plurality of compare circuits, wherein:
a first input of each comparator is coupled to an output from one of the plurality of threshold registers; and a second input of each comparator receives the temporal deviation, wherein each compare circuit coupled to the temperature sensor and configured to:
compare the temporal deviation with one of the threshold time values; and
transmit a signal corresponding to a result of the comparison;
wherein the TDD is configured to implement a power management scheme of a power management unit within the DSP, based on the transmitted signal from any compare circuit from the plurality of compare circuits, to control the SRAM, comprising a plurality of SRAM frame buffer blocks, wherein the SRAM frame buffer blocks are capable of entering at least one of a shutdown, standby, or sleep state according to the power management scheme.

15. A digital signal processor (DSP) capable of synchronizing sensor data from a plurality of sensors generating independent sensor data at differing latency rates, comprising:
a first sensor input for receiving sensor data from a first sensor;
a second sensor input for receiving sensor data from a second sensor;
a processor circuit configured to:
generate a time stamp information signal; and
provide the generated time stamp information signal to the first and second sensors to synchronize the time stamp counter in each sensor; and
a temporal deviation detection device (TDD) configured to:
receive sensor data from the first and second sensor inputs;
analyze time stamp data from each sensor corresponding to the received sensor data;
calculate a temporal deviation in the time stamp data between each sensor;
determine an amount of frame buffer memory in a SRAM required to store sensor data from the time stamp occurring earlier in time from either the first or second sensor than the time stamp from the remaining sensor;
determine if the temporal deviation is below a threshold value of an available memory buffer embedded within the DSP to store the sensor data having the earlier time stamp until the sensor data from the remaining sensor contains a second time stamp that is equal to earlier time stamp to allow sensor data from each sensor having the same time stamp to be processed by a processor of the DSP substantially simultaneously with each other; and
initiate a fault correction sequence if the temporal deviation exceeds the threshold value.

16. A digital signal processor according to claim 15, wherein the fault correction sequence comprises:
generating an interrupt signal; and
sending configuration data to each sensor.

17. A digital signal processor according to claim 15, wherein the processor circuit is configured to generate a second time stamp information signal and provide the second time stamp information signal to each sensor to reset and synchronize the time stamp counter in each sensor following the initiation of the fault correction sequence.

18. A digital signal processor according to claim 15, wherein the configuration data comprises instructions that cause each sensor to perform at least one of: a soft reset; a reconfiguration of the sample rate of the sensor; an alteration of the clocking of the sensor; or provide a status to the TDD.

19. A digital signal processor according to claim 17, wherein the TDD is configured to:
determine a fault cause based upon the received status; and
provide corrective action to one of the DSP or at least one of the plurality of sensors according to the determined fault cause.

20. A digital signal processor according to claim 15, wherein the TDD comprises:
a plurality of threshold registers, wherein each threshold register stores a different predetermined threshold time value;
a plurality of compare circuits, wherein:
a first input of each comparator is coupled to an output from one of the plurality of threshold registers; and
a second input of each comparator receives the temporal deviation, wherein each compare circuit coupled to the temperature sensor and configured to:
compare the temporal deviation with one of the threshold time values; and
transmit a signal corresponding to a result of the comparison;
wherein the TDD is configured to implement a power management scheme of a power management unit within the DSP, based on the transmitted signal from any compare circuit from the plurality of compare circuits, to control the SRAM, comprising a plurality of SRAM frame buffer blocks, wherein the SRAM frame buffer blocks are capable of entering at least one of a shutdown, standby, or sleep state according to the power management scheme.

* * * * *